US012428703B2

(12) United States Patent
Basso et al.

(10) Patent No.: US 12,428,703 B2
(45) Date of Patent: Sep. 30, 2025

(54) PROCESS OF EXTRACTION OF METALS FROM A WET MASS OF WASTE

(71) Applicant: HBI S.r.l., Bolzano (IT)

(72) Inventors: Daniele Basso, Renon (IT); Renato Pavanetto, Quinto di Treviso (IT); Flavio Manenti, Bolzano (IT); Kristiano Prifti, Bolzano (IT)

(73) Assignee: HBI S.R.L., Bolzano (IT)

( * ) Notice: Subject to any disclaimer, the term of this patent is extended or adjusted under 35 U.S.C. 154(b) by 756 days.

(21) Appl. No.: 17/457,503

(22) Filed: Dec. 3, 2021

(65) Prior Publication Data
US 2022/0177998 A1 Jun. 9, 2022

(30) Foreign Application Priority Data
Dec. 4, 2020 (IT) .................. 102020000029888

(51) Int. Cl.
C02F 11/10 (2006.01)
B01J 6/00 (2006.01)
C02F 101/20 (2006.01)
C02F 103/24 (2006.01)
C02F 103/28 (2006.01)
C10J 3/84 (2006.01)
C10K 1/02 (2006.01)
C22B 7/00 (2006.01)
C22B 43/00 (2006.01)
C22B 17/02 (2006.01)
C22B 23/02 (2006.01)
C22B 34/30 (2006.01)

(52) U.S. Cl.
CPC .............. *C22B 7/001* (2013.01); *B01J 6/008* (2013.01); *C02F 11/10* (2013.01); *C10J 3/84* (2013.01); *C10K 1/024* (2013.01); *C02F 2101/20* (2013.01); *C02F 2103/24* (2013.01); *C02F 2103/28* (2013.01); *C10J 2300/0946* (2013.01); *C10J 2300/1618* (2013.01); *C10J 2300/1628* (2013.01); *C22B 17/02* (2013.01); *C22B 23/02* (2013.01); *C22B 34/30* (2013.01); *C22B 43/00* (2013.01)

(58) Field of Classification Search
CPC .................. Y02E 50/10; C02F 1/283
See application file for complete search history.

(56) References Cited

U.S. PATENT DOCUMENTS

| | | | | | |
|---|---|---|---|---|---|
| 4,668,429 | A | * | 5/1987 | Najjar | ...................... C10J 3/463 252/373 |
| 4,801,402 | A | * | 1/1989 | Najjar | ....................... C01B 3/36 208/53 |
| 2015/0183641 | A1 | * | 7/2015 | Heilmann | ............... C01B 25/32 71/37 |
| 2021/0087093 | A1 | * | 3/2021 | Lundqvist | ................. C10L 5/46 |

FOREIGN PATENT DOCUMENTS

| | | | |
|---|---|---|---|
| CN | 102875005 | B | 4/2014 |
| CN | 103755124 | A | 4/2014 |
| CN | 107504492 | A | 12/2017 |
| CN | 107572743 | A * | 1/2018 |
| CN | 110129579 | A | 8/2019 |
| WO | 2018044252 | A1 | 3/2018 |

OTHER PUBLICATIONS

Alatalo, Sara-Maaria, et al. "Adsorption behavior of hydrothermally treated municipal sludge & pulp and paper industry sludge." Bioresource technology 147 (2013): 71-76 (Year: 2013).*
Alam et al. "An overview of chromium removal techniques from tannery effluent", Applied Water Science (2020) 10:205 https://doi.org/10.1007/s13201-020-01286-0, 22 pages.
Italian Search Report & Opinion dated Aug. 4, 2021 from Italian Application No. 102020000029888, 10 pages.

* cited by examiner

Primary Examiner — Brian D Walck
Assistant Examiner — Sean P. O'Keefe
(74) Attorney, Agent, or Firm — INNOVATION CAPITAL LAW GROUP, LLP; Vic Lin

(57) ABSTRACT

A process of extracting metals from a wet mass includes a step A of concentrating the metals in a carbonaceous solid with a thermochemical treatment of the wet mass, with the ancillary production of a treatment gas; a step B of thermochemical decomposition of the carbonaceous solid in an atmosphere constituted by an operating gas which contains oxygen in substoichiometric quantity to carry out the thermochemical decomposition in order to promote a combination of the metals with substances present in the carbonaceous solid to form salts and others solid compounds and to concentrate the latter in residual ashes of the carbonaceous solid at the same time providing for the formation of a combustible synthesis gas comprising hydrocarbons from the carbonaceous solid; and a step C of extraction of the metals from the ashes produced.

15 Claims, No Drawings

PROCESS OF EXTRACTION OF METALS FROM A WET MASS OF WASTE

TECHNICAL FIELD

This invention relates to a process of extracting metals from a wet mass, having high humidity, for example equal to or greater than 60% by mass, such as, for example, tannery sludge, paper mill pulper waste or, more in general, from an industrial sludge.

BACKGROUND ART

Currently, for the treatment of masses contaminated by metals rich in humidity, such as for example a tannery sludge in which chromium is dispersed or a paper mill waste in which lead can be dispersed, the process is generally drying and disposal in landfills.

This traditional solution has numerous drawbacks.

Firstly, the drying results in a high expenditure of energy correlated to the latent heat of vaporization of the water to be eliminated from the wet mass by heating.

Moreover, it is necessary to avoid that the steam emitted by the wet mass during the drying phase carries volatile pollutants with it into the atmosphere.

A further drawback consists in the need to safely dispose of the dried material, preventing the dispersion of the metals it contains into the environment.

SUMMARY OF THE INVENTION

The problem underlying the invention is that of avoiding the drawbacks described above in particular by allowing the recovery of metals from a mass by means of a technically advantageous process.

The aim of the invention is to provide a process for extracting metals from a wet mass which solves this problem.

Within this aim, an object of the invention is to provide a process for extracting metals from a wet mass which allows an increase in the concentration of the metals with respect to the product to be dried which can be obtained by means of a traditional process.

Another aim of the invention is to provide a process for the extraction of metals from a wet mass which allows a high level of treatment safety to be guaranteed by easily preventing the entry into the atmosphere of hazardous substances that are volatile or that can be easily dragged into the atmosphere by gases, fumes and/or vapours.

A further aim of the invention is to provide a process for extracting metals from a wet mass which allows the energy efficiency to be increased with respect to a traditional treatment for drying the wet mass.

Another aim of the invention is to provide a process for extracting metals from a wet mass which allows a reduction in the bulk of residual solid products of the treated wet mass to be obtained, with respect to traditional treatments.

This aim, as well as other aims which will emerge more fully below, are attained by an apparatus for extracting metals from a wet mass according to the appended independent claim.

Detailed characteristics of a process for the extraction of metals from a wet mass, according to the invention, are described in the dependent claims.

Further characteristics and advantages of the invention will become clearer from the description of a preferred but not exclusive embodiment of a process for extracting metals from a wet mass, according to the invention.

DETAILED DESCRIPTION

The invention relates to a process of extracting metals from a wet mass such as:
 metals that may be present in an industrial sludge, for example lead, zinc, cadmium, copper, aluminium, iron, zinc and other heavy metals and inorganic compounds;
 metals that may be present in a processing waste of a tannery, for example mercury, cadmium, chromium;
 metals that may be present in a processing waste of a paper mill, for example copper, manganese, lead, chromium, zinc;
 metals that may be present in a processing waste of a graphics industry, for example metal chlorides;
 According to the invention, said process comprises:
 a step A of concentration of said metals in a carbonaceous solid by means of a thermochemical treatment of the wet mass to transform it into the carbonaceous solid with ancillary production of a treatment gas;
 a step B of thermochemical decomposition of the carbonaceous solid in an atmosphere constituted by an operating gas which preferably contains oxygen in a substoichiometric quantity to carry out said thermochemical decomposition so as to promote a combination of said metals with substances present in the carbonaceous solid to form salts and other solid compounds and preferably preventing the formation of oxides of said metals and concentration of said salts and other solid compounds in residual ashes of the carbonaceous solid, at the same time providing for the formation of a combustible synthesis gas comprising hydrocarbons from the carbonaceous solid;
 a step C of extraction of the metals from said ashes.

In particular, the thermochemical treatment of the step A can comprise treating the wet mass at a treatment temperature of between 150° C. and 300° C., preferably at a treatment pressure of between 10 atm and 50 atm, that is, higher than the vapour pressure of the water at the treatment temperature, preferably but not exclusively for a time of between 30 minutes and 8 hours, in the presence of liquid water;
 Said wet mass preferably comprises:
 industrial processing waste in the form of material dissolved and/or suspended in water; said metals can comprise lead, zinc, cadmium, copper, aluminium, iron, zinc;
 a sludge produced in a tanning process; said metals comprise chromium and/or cobalt and/or cadmium and/or mercury and/or chromium and/or lead and/or copper;
 a waste produced by paper mill pulpers; said metals comprising lead and/or copper and/or manganese and/or chromium and/or zinc;
 a waste produced by a graphics industry; said metals comprising lead and/or chlorides.

The step C preferably comprises a solubilization of said salts and/or other solid compounds to extract said metals.

Preferably, for the extraction of metals from the ashes, according to the type of metal to be extracted, traditional processes are used, for example chosen from: leaching, precipitation, liquid-liquid extraction, extraction using ion exchange resins, reverse osmosis and electrolysis, polymer-supported ultrafiltration (PSU), adsorption and absorption, "carrier-in-pulp". In this last method, a carrier material, which recovers the extracted metals, is added simultaneously with ashes to a leaching solution and is collected from the pulp by the method of physical separation, such as magnetic separation or sieving.

Said thermochemical decomposition can comprise—or can consist in—a choice of:
- a gasification operation of said carbonaceous solid;
- a pyrolysis operation of said carbonaceous solid;
- a pyro-gasification operation of said carbonaceous solid;
- a combustion operation of said carbonaceous solid;
- an oxygen-combustion and/or steam-combustion operation of said carbonaceous solid.

The step A can comprise, or consist of, a hydrothermal carbonization of said wet mass.

The operating gas used in the step B can consist of a mixture comprising:
- said treatment gas which is obtained in the step A and contains steam, carbon dioxide, nitrogen and sulphur compounds and traces of carbon monoxide and light aromatic hydrocarbons and polluting and odorous components;
- an auxiliary gas containing oxygen in gaseous form and/or its compounds and which preferably comprises or consists of ambient air;

where the auxiliary gas is mixed with the treatment gas to obtain a predefined concentration of oxygen present in the atmosphere in which the step B is implemented.

In this way, the odorous and/or polluting gaseous fractions contained in the treatment gas resulting from the step A, rather than being dispersed into the atmosphere, are at least partially used as reactive substances and/or as carrier gas in the step B, such as the oxygen contained in the steam, carbon dioxide, carbon monoxide and hydrocarbons.

Thus, the dual advantage is obtained of powering step B with the treatment gas which contains oxygen useful in step B at the same time avoiding the polluting effect of introducing the treatment gas into the atmosphere, avoiding any treatment operations of the latter for the elimination of pollutants and/or odours contained in it.

The process can also comprise a step D of producing thermal and/or electrical energy by combustion of the synthesis gas.

Preferably, said energy is used, at least partially, to carry out said process or to power industrial components of a plant in which said process is implemented to treat the sludge produced by the plant itself.

In this way, not only the waste of the process is reduced, by using the synthesis gas in a combustion, but the energy efficiency of the process itself is increased by using the energy produced by the combustion of the synthesis gas to carry out the same process.

This process may also comprise:
- a step F which provides for filtering by washing the synthesis gas produced in step B, obtaining a waste liquid containing hydrocarbons;
- a step G of adding the waste liquid to the wet mass before the thermochemical treatment of said step A.

In this way, the hydrocarbons present in the washing water are recovered, achieving a dual advantage of reducing the harmful substances deriving from the combustion process, thus reducing the environmental impact of this process, and increasing the calorific value of the carbonaceous solid so as to increase the energy efficiency of the entire process.

It is therefore easy to understand how, in general, the process allows an increase in the concentration of the metals with respect to the product to be dried, which can be obtained by means of a traditional process.

In fact, the step A makes it possible to find in the carbonaceous solid obtained a concentration of metals much higher than the 90% of the metals originally contained in the wet mass.

On the other hand, the step B prevents the metals from combining to form light and volatile compounds that are easily dragged by the synthesis gas formed.

In fact, the step B promotes the formation of salts and other solid compounds which generally consist of heavy fractions from which, however, it is easy to obtain the metals to be extracted, for example by solubilization.

Moreover, even following the step B the quantity of metals remains substantially higher than the 90% of the quantity of metals originally contained in the initial wet mass.

In this way, the process according to the invention proves to be highly efficient in concentrating the metals of the original wet mass in the ashes resulting from the step B.

The process according to the invention is simple to implement directly at the wet mass production site, such as at an industry, a tannery or a paper mill.

It can be easily implemented continuously and requires a treatment time of between, for example, 3 and 5 hours.

Moreover, it is easy to understand how a process for extracting metals from a wet mass according to the invention therefore allows a high level of treatment safety to be guaranteed by preventing or greatly reducing the release into the atmosphere of volatile substances which are hazardous or which can be easily dragged into the atmosphere by fumes and/or vapours.

Moreover, a process for extracting metals from a wet mass according to the invention allows the energy efficiency to be increased with respect to a traditional wet mass drying treatment and to obtain a reduction in the bulk of residual solid products of the treated wet mass, compared to traditional treatments.

The invention thus conceived is susceptible to numerous modifications and variations, all of which fall within the scope of protection of the attached claims.

Further, all details may be replaced by other technically equivalent elements.

Where the operating and technical features mentioned are followed by signs or reference numbers, the signs or reference numbers have been used only with the aim of increasing the intelligibility of the description and claims themselves and, consequently, they do not constitute in any way a limitation to the interpretation of each element identified, purely by way of example, by the signs or reference numerals.

The invention claimed is:

1. A process of extracting metals from a wet mass comprising:
   a step A of concentration of said metals in a carbonaceous solid by means of a thermochemical treatment of said wet mass to transform the wet mass into said carbonaceous solid; wherein said thermochemical treatment involves treating said wet mass at a treatment temperature between 150° C. and 300° C. and at a treatment pressure between 10 atm and 50 atm, in the presence of liquid water, with ancillary production of a treatment gas;
   a step B of thermochemical decomposition of said carbonaceous solid in an atmosphere consisting of an operating gas which comprises oxygen in a substoichiometric quantity, and the treatment gas, to carry out said thermochemical decomposition so as to promote a combination of said metals with substances present in said carbonaceous solid to form solid compounds and to concentrate said solid compounds in residual ashes of said carbonaceous solid at the same time providing for forming from said carbonaceous solid a combustible synthesis gas comprising hydrocarbons;

a step C of extracting said metals from said ashes;

washing the synthesis gas produced in said step B to obtain a waste liquid containing hydrocarbons; and repeating said step A while adding said waste liquid to said wet mass before the thermochemical treatment.

2. The process according to claim 1 wherein said wet mass comprises:
a sludge produced in a tanning process; said metals including chromium and/or cobalt and/or cadmium and/or mercury;
and/or a waste produced by paper mill pulper; said metals including lead;
and/or an industrial sludge.

3. The process according to claim 2 wherein said solid compounds comprise salts of said metals.

4. The process according to claim 2 wherein said thermochemical decomposition comprises either:
a gasification operation of said carbonaceous solid;
a pyrolysis operation of said carbonaceous solid;
a pyro-gasification operation of said carbonaceous solid;
a combustion operation of said carbonaceous solid; or
an oxygen-combustion and/or steam-combustion operation of said carbonaceous solid.

5. The process according to claim 2 wherein said step A comprises a hydrothermal carbonization of said wet mass and said operating gas consists of a mixture comprising:
said treatment gas which is obtained in said step A and contains steam, carbon dioxide, nitrogen and sulfur and traces of carbon monoxide and light aromatic hydrocarbons and polluting and odorous components;
an auxiliary gas containing oxygen in gaseous form and/or oxygen compounds;
wherein said auxiliary gas is mixed with said treatment gas to obtain a predefined concentration of oxygen present in the atmosphere in which said step B is implemented.

6. The process according to claim 5 which comprises a step D of producing thermal and/or electrical energy by combustion of said synthesis gas.

7. The process according to claim 1 wherein said step C comprises a solubilization of said solid compounds to extract said metals.

8. The process according to claim 1 wherein said thermochemical decomposition comprises either:
a gasification operation of said carbonaceous solid;
a pyrolysis operation of said carbonaceous solid;
a pyro-gasification operation of said carbonaceous solid;
a combustion operation of said carbonaceous solid; or
an oxygen-combustion and/or steam-combustion operation of said carbonaceous solid.

9. The process according to claim 8 wherein said step A comprises a hydrothermal carbonization of said wet mass and said operating gas consists of a mixture comprising:
said treatment gas which is obtained in said step A and contains steam, carbon dioxide, nitrogen and sulfur and traces of carbon monoxide and light aromatic hydrocarbons and polluting and odorous components;
an auxiliary gas containing oxygen in gaseous form and/or oxygen compounds;
wherein said auxiliary gas is mixed with said treatment gas to obtain a predefined concentration of oxygen present in the atmosphere in which said step B is implemented.

10. The process according to claim 9 which comprises a step D of producing thermal and/or electrical energy by combustion of said synthesis gas.

11. The process according to claim 10 which comprises:
a step F which provides for filtering by washing the synthesis gas produced in said step B, obtaining a waste liquid containing hydrocarbons;
a step G of adding said waste liquid to said wet mass before the thermochemical treatment of said step A.

12. The process according to claim 1 wherein said step A comprises a hydrothermal carbonization of said wet mass.

13. The process according to claim 1 wherein said operating gas consists of a mixture comprising:
said treatment gas which is obtained in said step A and contains steam, carbon dioxide, nitrogen and sulfur and traces of carbon monoxide and light aromatic hydrocarbons and polluting and odorous components;
an auxiliary gas containing oxygen in gaseous form and/or oxygen compounds;
wherein said auxiliary gas is mixed with said treatment gas to obtain a predefined concentration of oxygen present in the atmosphere in which said step B is implemented.

14. The process according to claim 1 which comprises a step D of producing thermal and/or electrical energy by combustion of said synthesis gas.

15. The process according to claim 1, wherein the treatment pressure is greater than the vapor pressure of water at the treatment temperature.

* * * * *